United States Patent
Futagi (10) Patent No.: US 12,229,432 B2
(45) Date of Patent: Feb. 18, 2025

(54) MEMORY SYSTEM AND RANDOM NUMBER GENERATION DEVICE

(71) Applicant: KIOXIA CORPORATION, Tokyo (JP)

(72) Inventor: Junpei Futagi, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 239 days.

(21) Appl. No.: 17/685,331

(22) Filed: Mar. 2, 2022

(65) Prior Publication Data

US 2023/0091431 A1  Mar. 23, 2023

(30) Foreign Application Priority Data

Sep. 22, 2021  (JP) .................................. 2021-153871

(51) Int. Cl.
  G06F 3/06  (2006.01)
  G06F 7/58  (2006.01)

(52) U.S. Cl.
  CPC .......... G06F 3/0655 (2013.01); G06F 3/0604 (2013.01); G06F 3/0679 (2013.01); G06F 7/582 (2013.01)

(58) Field of Classification Search
  CPC .... G06F 3/0655; G06F 3/0604; G06F 3/0679; G06F 7/582
  See application file for complete search history.

(56) References Cited

U.S. PATENT DOCUMENTS

| | | | |
|---|---|---|---|
| 9,846,569 B1 * | 12/2017 | Liu | G06F 7/588 |
| 10,754,619 B2 | 8/2020 | Satpathy et al. | |
| 2004/0236819 A1 * | 11/2004 | Anati | H04L 63/0853 709/200 |
| 2010/0002877 A1 * | 1/2010 | Zhang | H04L 9/0662 380/46 |
| 2012/0191615 A1 * | 7/2012 | Schibuk | G06Q 20/401 705/76 |
| 2015/0058841 A1 * | 2/2015 | Krempa | G06F 9/45558 718/1 |
| 2015/0096032 A1 * | 4/2015 | Hay | G06F 21/577 726/25 |
| 2015/0199217 A1 * | 7/2015 | Shankar | G06F 7/588 718/1 |
| 2017/0085654 A1 * | 3/2017 | Mikhailov | G06F 7/58 |

(Continued)

*Primary Examiner* — Carl G Colin
*Assistant Examiner* — Zhe Liu
(74) *Attorney, Agent, or Firm* — Kim & Stewart LLP (57) ABSTRACT

A memory system connectable to a host device includes a nonvolatile memory, a first circuit configured to generate a sequence of random number bits, and a processor configured to instruct the circuit to generate a sequence of random number bits having a first length, calculate a first value indicating randomness of the sequence, determine whether the first value exceeds a threshold value, upon determining that the first value exceeds the threshold value, generate a pseudo random number using the sequence, upon determining that the first value does not exceed the threshold value, instruct the first circuit to generate another sequence of random number bits having a second length greater than the first length, and generate a pseudo random number using said another sequence, and write or read data to or from the nonvolatile memory using the generated pseudo random number.

11 Claims, 10 Drawing Sheets

(56) References Cited

U.S. PATENT DOCUMENTS

| | | | |
|---|---|---|---|
| 2018/0364984 A1* | 12/2018 | Schumacher | G06F 7/588 |
| 2020/0097254 A1 | 3/2020 | Leitao et al. | |
| 2020/0151077 A1 | 5/2020 | Wong et al. | |
| 2021/0266302 A1* | 8/2021 | Daly | G06F 21/44 |
| 2022/0057850 A1* | 2/2022 | Abellan | G06F 7/58 |

\* cited by examiner

MEMORY SYSTEM AND RANDOM NUMBER GENERATION DEVICE

CROSS-REFERENCE TO RELATED APPLICATION

This application is based upon and claims the benefit of priority from Japanese Patent Application No. 2021-153871, filed Sep. 22, 2021, the entire contents of which are incorporated herein by reference.

FIELD

Embodiments described herein relate generally to a memory system that controls a nonvolatile memory, a random number generation device, and a method for generating a pseudo random number by a memory system.

BACKGROUND

In recent years, a memory system that includes a nonvolatile memory, such as a solid-state drive (SSD) with NAND flash memory, has become widely available. A SSD is used in various computers.

In such a memory system, a random number generation mechanism may be used to protect data stored in the nonvolatile memory. For example, the random number generation mechanism generates a pseudo random number based on a sequence of random number bits generated by an entropy source. Security strength is tied to randomness (true randomness) of the generated pseudo random number, which depends on the randomness of the entropy input from the entropy source.

However, the randomness of the entropy input may decrease due to, for example, deterioration in the entropy source over time. Therefore, it is required to implement a new technique that can generate a pseudo random number having stable security strength over time.

DETAILED DESCRIPTION

Embodiments provide a memory system and a random number generation device capable of generating a pseudo random number having stable security strength.

In general, according to one embodiment, a memory system connectable to a host device includes a nonvolatile memory, a first circuit configured to generate a sequence of random number bits, and a processor. The processor is configured to instruct the first circuit to generate a sequence of random number bits having a first length, calculate a first value indicating randomness of the sequence of random number bits, determine whether the first value exceeds a threshold value, upon determining that the first value exceeds the threshold value, generate a pseudo random number using the sequence of random number bits, upon determining that the first value does not exceed the threshold value, instruct the first circuit to generate another sequence of random number bits having a second length that is greater than the first length, and generate a pseudo random number using said another sequence of random number bits, and write or read data to or from the nonvolatile memory using the generated pseudo random number.

Hereinafter, certain example embodiments of the present disclosure will be described with reference to the drawings.

First Embodiment

Figure 1:
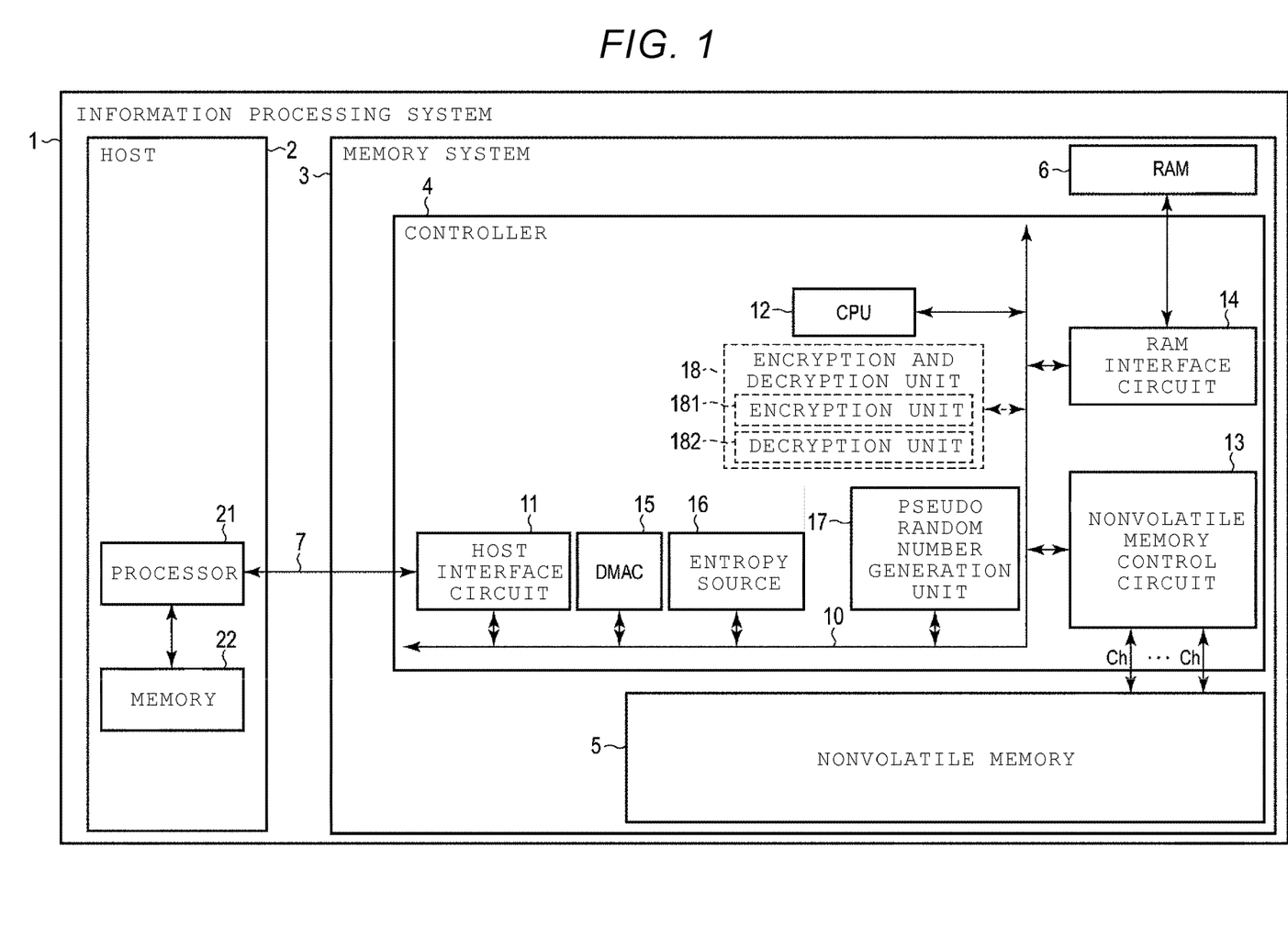
FIG. 1 is a block diagram of an information processing system including a memory system according to a first embodiment.

First, a configuration of a memory system 3 according to a first embodiment of the present disclosure will be described. FIG. 1 is a block diagram of an information processing system 1 including the memory system 3 according to the first embodiment of the present disclosure. The information processing system 1 includes a host 2 (also referred to as a host device 2 in some instances) and the memory system 3. The host 2 and the memory system 3 can be connected to each other via a bus 7. Communication between the host 2 and the memory system 3 via the bus 7 is executed, for example, in accordance with NVM Express™ (NVMe™) standards.

The host 2 is an information processing device. The host 2 is, for example, a personal computer or a server computer. The host 2 accesses the memory system 3. Specifically, the host 2 transmits a write command, which is a command for writing data, to the memory system 3. The host 2 transmits a read command, which is a command for reading data, to the memory system 3.

The memory system 3 is a storage device. The memory system 3 is, for example, an SSD including a NAND flash memory. The memory system 3 can be connected to the host 2 via the bus 7.

The bus 7 is, for example, a PCI Express™ (PCIe™) bus. The bus 7 is mainly used for transmitting an I/O command and a management command from the host 2 to the memory system 3 and transmitting a response from the memory system 3 to the host 2. The I/O command is a command for writing and reading data to and from a nonvolatile memory. Examples of the I/O command include the write command and the read command. The management command is a command for managing the memory system 3. The management command is, for example, an Admin command specified in the NVMe standards. An example of the management command includes a command for an instruction to change an encryption key.

Next, an internal configuration of the host 2 will be described. The host 2 includes a processor 21 and a memory 22. The host 2 may further include a storage device which is not illustrated.

The processor 21 is a central processing unit (CPU). The processor 21 communicates with the memory system 3 via the bus 7. The processor 21 executes host software loaded in the memory 22. The host software is loaded into the memory 22 from the memory system 3 or the storage device of the host 2. The host software includes an operating system, a file system, a device driver, an application program, and the like.

The memory 22 is a volatile memory. The memory 22 is, for example, a random access memory such as a dynamic random access memory (DRAM).

The memory system 3 includes a controller 4, a nonvolatile memory 5, and a random access memory (RAM) 6.

The controller 4 is a memory controller. The controller 4 is, for example, a control circuit such as a System-on-a-Chip (SoC). The controller 4 is communicably connected to the nonvolatile memory 5. The controller 4 writes and reads data to and from the nonvolatile memory 5. The controller 4 executes communication with an external device via the bus 7.

The nonvolatile memory 5 is a nonvolatile memory. The nonvolatile memory 5 is, for example, a NAND flash memory, a magnetoresistive random access memory (MRAM), a phase change random access memory (PRAM), a resistive random access memory (ReRAM), or a ferroelectric random access memory (FeRam). When the nonvolatile memory 5 is the NAND flash memory, the nonvolatile memory 5 is, for example, a flash memory having a two-dimensional structure or a flash memory having a three-dimensional structure.

The RAM 6 is a volatile memory. The RAM 6 is, for example, a DRAM.

The controller 4 includes a host interface circuit 11, a CPU 12, a nonvolatile memory control circuit 13, a RAM interface circuit 14, a direct memory access controller (DMAC) 15, an entropy source 16, and a pseudo random number generation unit 17. The controller 4 may further include an encryption and decryption unit 18. The host interface circuit 11, the CPU 12, the nonvolatile memory control circuit 13, the RAM interface circuit 14, the DMAC 15, the entropy source 16, the pseudo random number generation unit 17, and the encryption and decryption unit 18 are connected to each other via an internal bus 10.

The host interface circuit 11 is a hardware interface. The host interface circuit 11 executes communication with an external device. The host interface circuit 11 receives various commands from the host 2. The various commands are, for example, the I/O command and the management command.

The CPU 12 is a processor. The CPU 12 controls the host interface circuit 11, the nonvolatile memory control circuit 13, the RAM interface circuit 14, the DMAC 15, the entropy source 16, the pseudo random number generation unit 17, and the encryption and decryption unit 18. The CPU 12 loads a control program (or a firmware program) from a ROM (read only memory) which is not illustrated, or the nonvolatile memory 5 into the RAM 6 when power is supplied to the memory system 3. The CPU 12 performs various processes by executing the control program. For example, the CPU 12 executes management of data stored in the nonvolatile memory 5 and management of blocks in the nonvolatile memory 5 as a flash translation layer (FTL). The management of the data stored in the nonvolatile memory 5 includes, for example, maintaining mapping information indicating a relationship between a logical address and a physical address. A logical address is an address value used by the host 2 for accessing data stored in the memory system 3. The logical address is, for example, a logical block address (LBA). A physical address is an address value indicating a physical storage location in the nonvolatile memory 5. The management of the blocks in the nonvolatile memory 5 includes, for example, tracking of a defective block (or a bad block) in the nonvolatile memory 5, wear leveling, and garbage collection (or compaction).

The nonvolatile memory control circuit 13 controls a plurality of nonvolatile memory chips. For example, the nonvolatile memory control circuit 13 is connected to the plurality of nonvolatile memory chips via a plurality of channels (Ch).

The RAM interface circuit 14 that controls the RAM 6. The RAM interface circuit 14 is, for example, a circuit that controls the DRAM.

The DMAC 15 is a circuit that executes a direct memory access (DMA). The DMAC 15 executes data transfer between the memory 22 of the host 2 and the RAM 6.

The entropy source 16 is a circuit that generates a sequence of random number bits. The entropy source 16 is, for example, an oscillator. For example, the entropy source 16 conforms to security standards of NIST SP 800-90B. The entropy source 16 generates the sequence of the random number bits based on a random number bit length. The random number bit length is a numerical value representing a length of the sequence of the random number bits. For example, the random number bit length is stored in the nonvolatile memory 5. The entropy source 16 determines the length of the sequence of the random number bits to be generated by acquiring the random number bit length from the nonvolatile memory 5.

The pseudo random number generation unit 17 is a circuit that generates a pseudo random number. The pseudo random number generation unit 17 is, for example, a deterministic random bit generator (DRBG) conforming to security standards of NIST SP 800-90A. The pseudo random number generation unit 17 generates the pseudo random number by using the sequence of the random number bits generated by the entropy source 16 as an entropy input. Security strength of the pseudo random number generated by the pseudo random number generation unit 17 depends on randomness (true randomness) of the entropy input and a length of the entropy input.

The encryption and decryption unit 18 is a circuit that executes an encryption process and a decryption process. The encryption process and the decryption process are executed by using an encryption key managed by the encryption and decryption unit 18. The encryption key managed by the encryption and decryption unit 18 is, for example, the pseudo random number generated by the pseudo random number generation unit 17. The encryption and decryption unit 18 includes an encryption unit 181 and a decryption unit 182. The encryption unit 181 encrypts data to be written to the nonvolatile memory 5 by using the encryption key. The decryption unit 182 decrypts the encrypted data read from the nonvolatile memory 5 by using the encryption key managed by the encryption and decryption unit 18.

Figure 2:
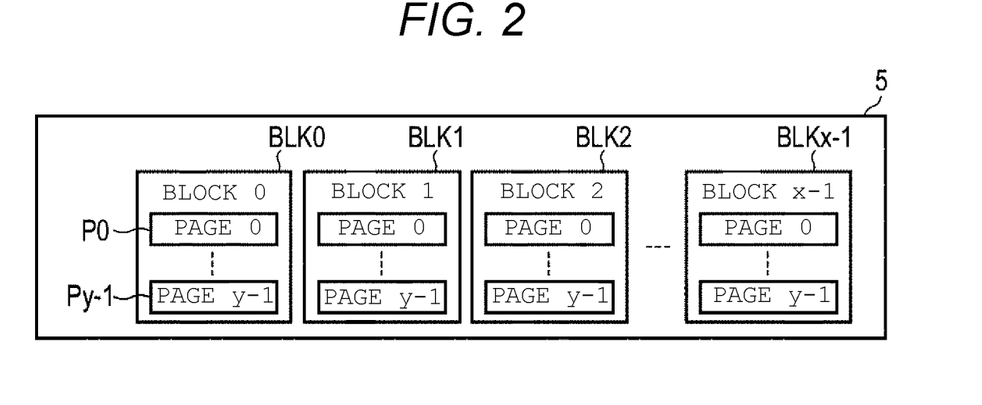
FIG. 2 is a block diagram of a nonvolatile memory according to a first embodiment.

Next, an example of an internal configuration of the nonvolatile memory 5 will be described. FIG. 2 is a block diagram illustrating an example of the internal configuration of the nonvolatile memory 5 in the memory system 3 according to the first embodiment of the present disclosure.

The nonvolatile memory 5 includes a plurality of blocks BLK0 to BLKx-1. Each of the blocks BLK0 to BLKx-1 is a unit of a data erasing operation for erasing data. That is, the minimum erasable unit is one block. Each of the blocks BLK0 to BLKx-1 can also be referred to as a physical block, an erase block, a flash block, or a memory block. Each of the blocks BLK0 to BLKx-1 includes a plurality of pages P0 to Py-1. Each of the pages P0 to Py-1 is a unit of a data write operation for writing data and a data read operation for reading data. Each of the pages P0 to Py-1 includes a plurality of memory cells connected to the same word line.

Figure 3:
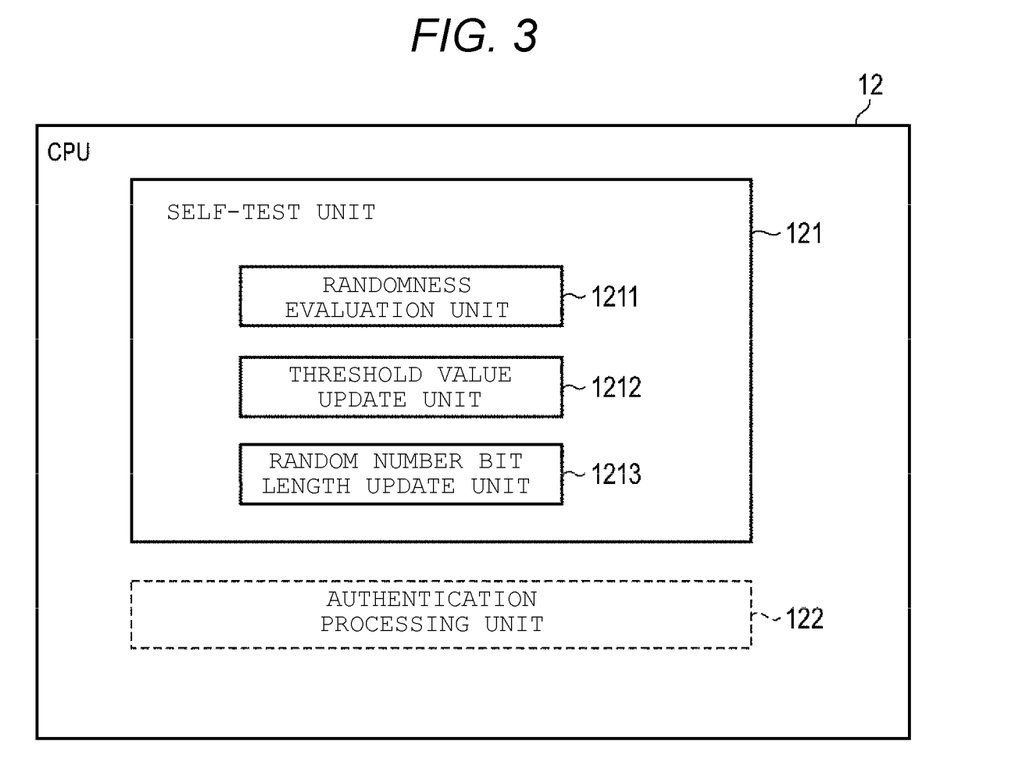
FIG. 3 is a functional block diagram of a memory system according to a first embodiment.

Next, functions performed by the CPU 12 will be described. FIG. 3 is a functional block diagram of the memory system 3 including the CPU 12 according to the first embodiment of the present disclosure.

The CPU 12 performs the function of a self-test unit 121. A part or all of the self-test unit 121 may be implemented by another circuit of the controller 4.

The self-test unit 121 includes a randomness evaluation unit 1211, a threshold value update unit 1212, and a random number bit length update unit 1213.

The randomness evaluation unit 1211 calculates a value indicating randomness of the sequence of the random number bits generated by the entropy source 16. For example, the randomness evaluation unit 1211 calculates a minimum entropy of the sequence of the random number bits as the value indicating the randomness of the sequence of the random number bits. Next, the randomness evaluation unit 1211 compares the calculated value with a threshold value. The threshold value is a reference value used to evaluate the randomness of the sequence of the random number bits. When the calculated value exceeds the threshold value, the randomness evaluation unit 1211 inputs the sequence of the random number bits generated by the entropy source 16 to the pseudo random number generation unit 17. When the calculated value is equal to or less than the threshold value, the randomness evaluation unit 1211 instructs the threshold value update unit 1212 to update the threshold value to a lower value without inputting the sequence of the random number bits generated by the entropy source 16 to the pseudo random number generation unit 17.

The threshold value update unit 1212 updates the threshold value. The threshold value update unit 1212 updates the threshold value so that the threshold value becomes a value smaller than a current value in response to the instruction from the randomness evaluation unit 1211. Next, the threshold value update unit 1212 notifies the random number bit length update unit 1213 of the updated threshold value.

When the threshold value is updated to the lower value, the random number bit length update unit 1213 increases the random number bit length so that the length of the sequence of the generated random number bits becomes long.

The CPU 12 may perform the function of an authentication processing unit 122. A part or all of the authentication processing unit 122 may be implemented by another circuit of the controller 4.

The authentication processing unit 122 uses the pseudo random number generated by the pseudo random number generation unit 17 as identification information, thereby executing an authentication process. The authentication process is a process of confirming whether the host 2 is a host having authority to access protected data stored in the nonvolatile memory 5. The authentication processing unit 122 notifies the host 2 of the pseudo random number generated by the pseudo random number generation unit 17 as the identification information. Next, the authentication processing unit 122 executes the authentication process with respect to the host 2 based on information indicating whether identification information input to the memory system 3 by the host 2 matches the identification information notified to the host 2.

Figure 4:
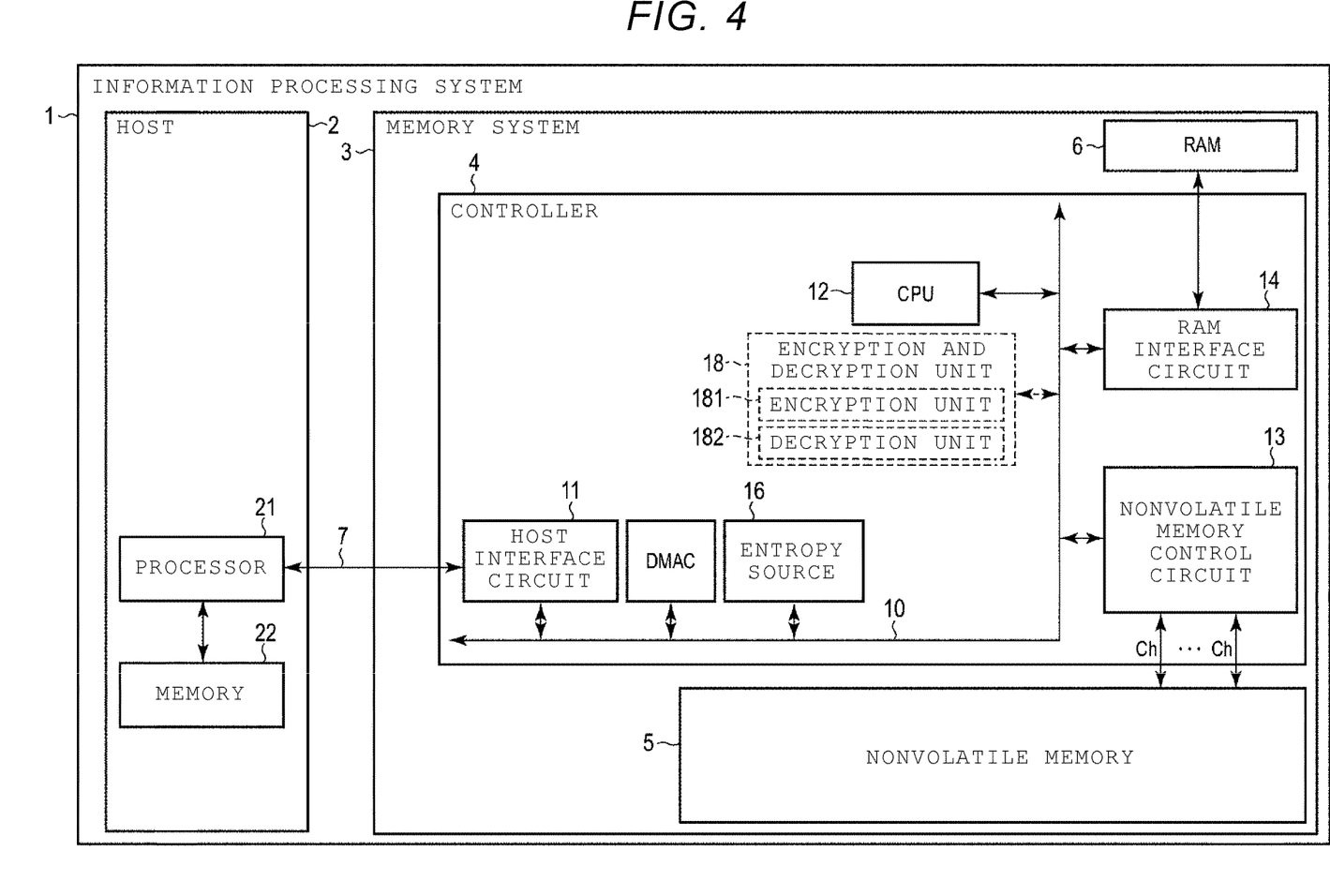
FIG. 4 is a block diagram of an information processing system including a memory system according to a first embodiment.
Figure 5:
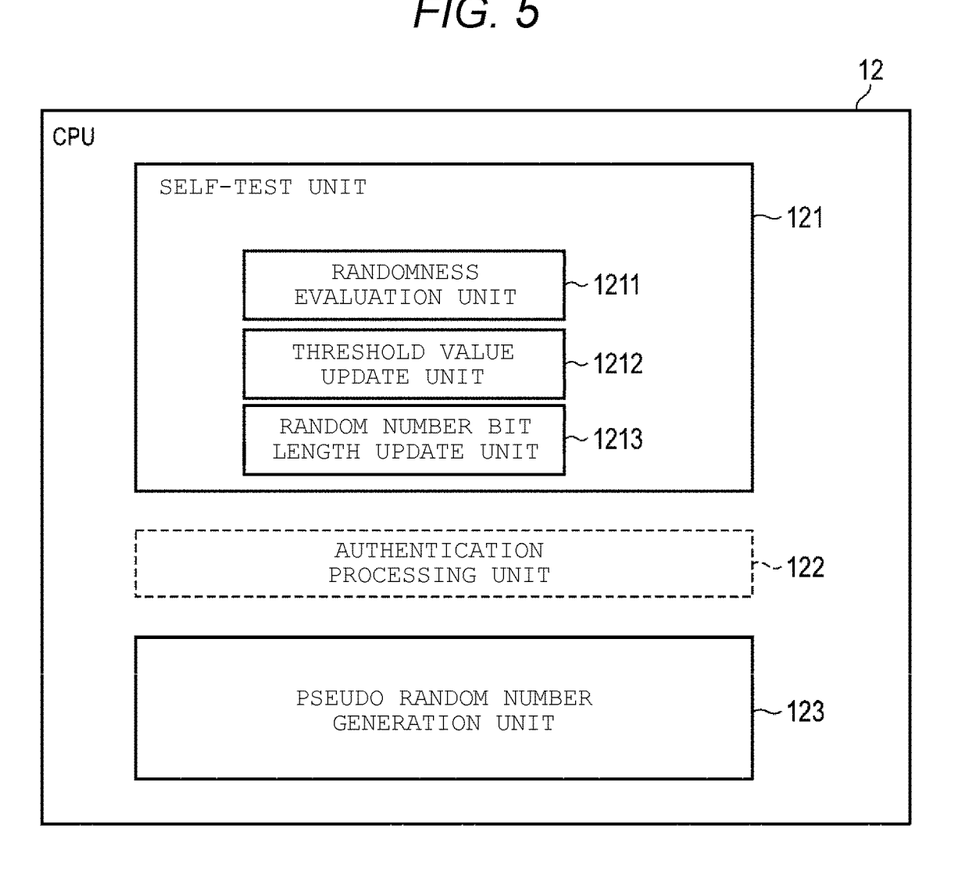
FIG. 5 is a functional block diagram of a memory system according to a first embodiment.

Next, another configuration example of the memory system 3 according to the first embodiment will be described. FIG. 4 is a block diagram illustrating this additional example of the information processing system 1 including the memory system 3 according to the first embodiment. FIG. 5 is a functional block diagram of the memory system 3 including the CPU 12 in this additional example.

Almost all the components in the memory system 3 of this example are the same as those of the memory system 3 described with reference to FIGS. 1, 2, and 3. Therefore, primarily the differences will be described.

In the memory system 3 of this example, the controller 4 does not include the pseudo random number generation unit 17. Instead, the CPU 12 performs the function of a pseudo random number generation unit 123.

A process executed by the pseudo random number generation unit 123 is substantially the same as the process executed by the pseudo random number generation unit 17.

Hereinafter, a case in which the pseudo random number is generated by the pseudo random number generation unit 17 (which is a component of the controller 4) is described.

Figure 6:
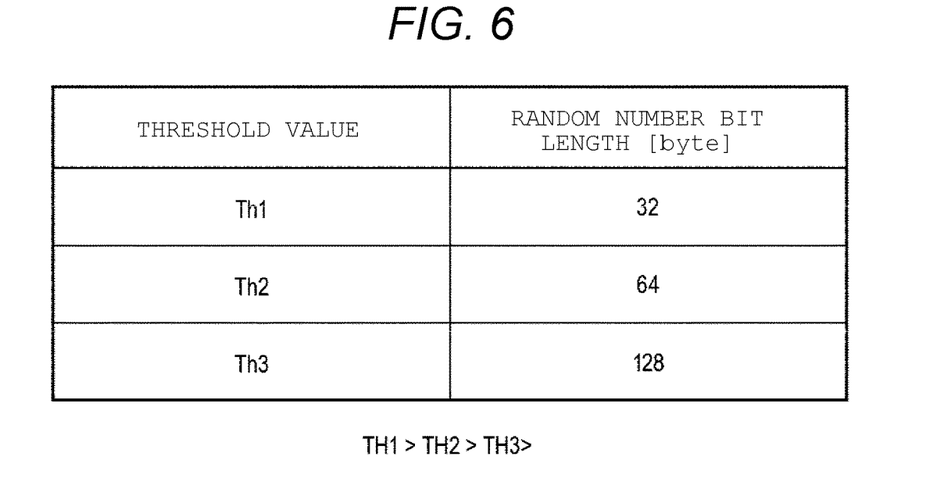
FIG. 6 depicts relationships between threshold values and random number bit lengths used by a memory system according to a first embodiment.

Next, a corresponding relation between a threshold value updated by the threshold value update unit 1212 and a length of the sequence of the random number bits updated by the random number bit length update unit 1213 will be described. FIG. 6 depicts the relationships between threshold values and random number bit lengths used by the memory system 3 according to the first embodiment of the present disclosure. A threshold value Th2 is smaller than a threshold value Th1, and a threshold value Th3 is smaller than the threshold value Th2.

A random number bit length indicating 32 bytes corresponds to the threshold value Th1. A random number bit length indicating 64 bytes corresponds to the threshold value Th2. A random number bit length indicating 128 bytes corresponds to the threshold value Th3.

Figure 7:
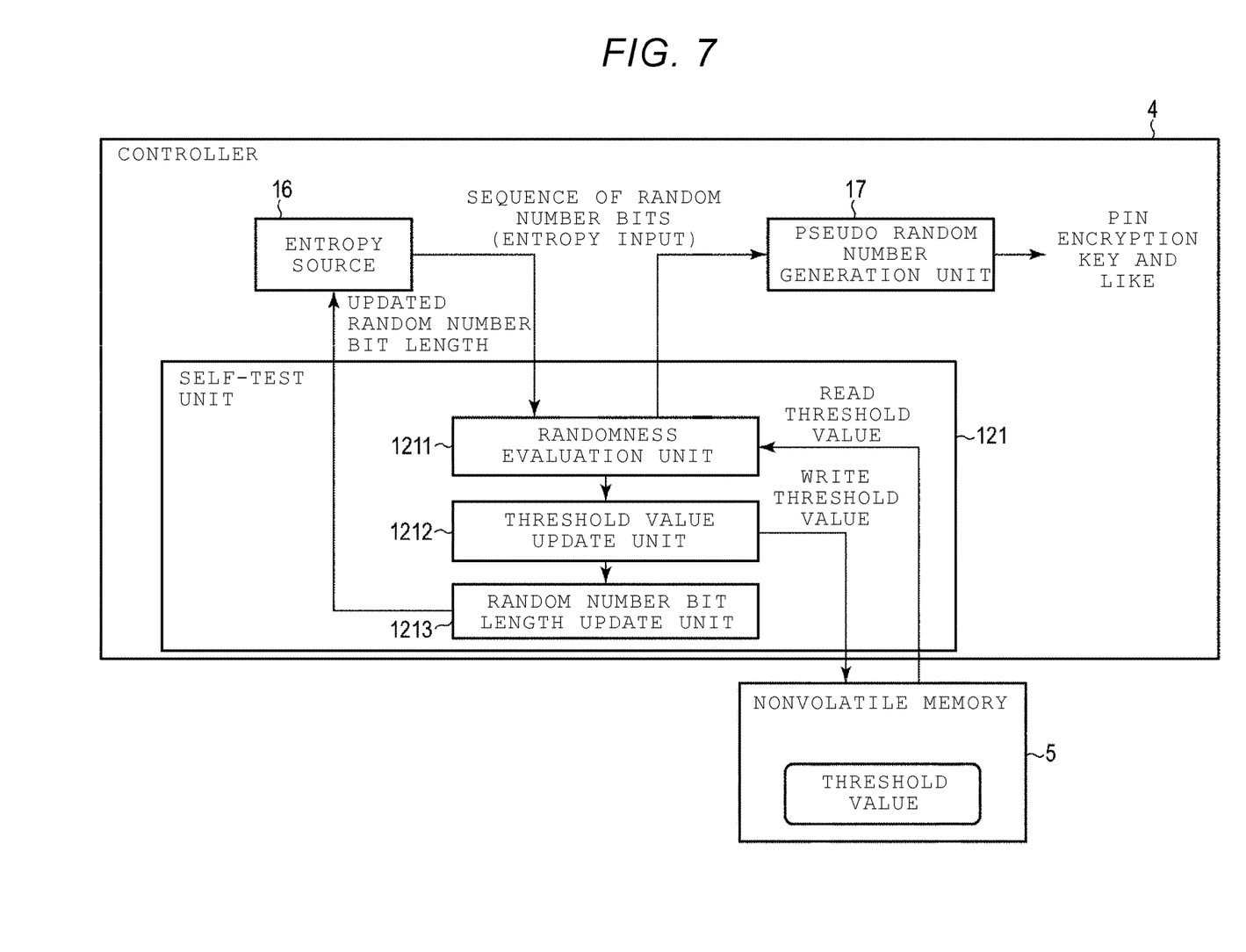
FIG. 7 depicts operations performed by a memory system according to a first embodiment.

FIG. 7 depicts operations performed by the memory system 3 according to the first embodiment. In particular, the block diagram illustrates an entropy input to be input to the self-test unit 121 and a threshold value when a randomness evaluation process is executed, an updated threshold value output from the self-test unit 121 when a threshold value update process is executed, and an updated random number bit length output from the self-test unit 121 when a random number bit length update process is executed according to the first embodiment of the present disclosure.

The entropy input is the sequence of the random number bits generated by the entropy source 16. The length of the entropy input is determined based on the random number bit length. The entropy input is input, by the entropy source 16, to the randomness evaluation unit 1211 of the self-test unit 121.

The randomness evaluation unit 1211 calculates a value indicating the randomness of the entropy input generated by the entropy source 16. Next, the randomness evaluation unit 1211 compares the threshold value with the calculated value. The threshold value is read from the nonvolatile memory 5 before the randomness evaluation unit 1211 compares the threshold value with the calculated value.

When the calculated value exceeds the read threshold value, the randomness evaluation unit 1211 inputs the entropy input generated by the entropy source 16 to the pseudo random number generation unit 17.

The pseudo random number generation unit 17 generates the pseudo random number by using the input entropy input.

When the calculated value is equal to or less than the read threshold value, the randomness evaluation unit 1211 instructs the threshold value update unit 1212 to update the threshold value without inputting the entropy input to the pseudo random number generation unit 17. When the calculated value is equal to or less than a minimum target value related to the randomness of the entropy input, the randomness evaluation unit 1211 notifies the host 2 that an error occurs without instructing the threshold value update unit 1212 to update the threshold value. Next, the randomness evaluation unit 1211 sets the memory system 3 to be in an error state. The memory system 3 in the error state does not execute any I/O command from the host 2. The minimum target value is a lower limit value of allowed randomness.

When the randomness evaluation unit 1211 instructs the threshold value update unit 1212 to update the threshold value, the threshold value update unit 1212 updates the threshold value. The updated threshold value is lower than the current threshold value. The threshold value update unit 1212 writes the updated threshold value to the nonvolatile memory 5. The threshold value is updated within a range from a predetermined maximum value to a predetermined minimum value. The minimum value of the threshold value may be set to a value greater than the minimum target value related to the randomness of the entropy input by a predetermined amount. When the updated threshold value is written to the nonvolatile memory 5, the threshold value update unit 1212 notifies the random number bit length update unit 1213 of the updated threshold value.

The random number bit length update unit 1213 notified of the updated threshold value updates the random number bit length based on the updated threshold value. In this case, the random number bit length update unit 1213 determines the random number bit length corresponding to the updated threshold value. The random number bit length update unit 1213 updates the random number bit length by writing the determined random number bit length to the nonvolatile memory 5. Next, the random number bit length update unit 1213 notifies the entropy source 16 of the updated random number bit length. The updated random number bit length is a value greater than the current random number bit length.

The entropy source 16 generates the sequence of the random number bits having a length indicated by the updated random number bit length to be used as the entropy input. The entropy source 16 provides the generated entropy input to the randomness evaluation unit 1211 of the self-test unit 121.

In this manner, while the value calculated by the randomness evaluation unit 1211 exceeds the minimum target value related to the randomness of the entropy input, the threshold value and the random number bit length are dynamically updated in response to a decrease in the randomness. Therefore, even when the randomness of the sequence of the random number bits generated as the entropy input by the entropy source 16 is reduced, the self-test unit 121 can maintain the security strength of the pseudo random number generated by the pseudo random number generation unit 17 without causing an error.

Aspects of the pseudo random number generated by the pseudo random number generation unit 17 will be described. A value of the pseudo random number generated by the pseudo random number generation unit 17 is determined based on a current internal state of the pseudo random number generation unit 17 and an arithmetic algorithm. The current internal state of the pseudo random number generation unit 17 is changed between a plurality of internal states. An initial internal state of the pseudo random number generation unit 17 is determined based on the entropy input. When the entropy input has sufficient randomness, the pseudo random number generation unit 17 can generate an unpredictable pseudo random number. The unpredictable pseudo random number is referred to as a cryptographically safe pseudo random number. That is, when the sequence of the random number bits generated by the entropy source 16 has sufficient randomness, the pseudo random number generation unit 17 can function as a cryptographically safe pseudo random number generator (or a cryptographic random bit generator). In such a case, the pseudo random number generated by the pseudo random number generation unit 17 has sufficient security strength. The pseudo random number generated by the pseudo random number generation unit 17 can be used to protect the data stored in the nonvolatile memory 5. Specifically, the pseudo random number generated by the pseudo random number generation unit 17 is used as, for example, an encryption key used by the encryption and decryption unit 18 or a personal identification number (PIN). The PIN is the identification information used in the authentication process.

Figure 8:
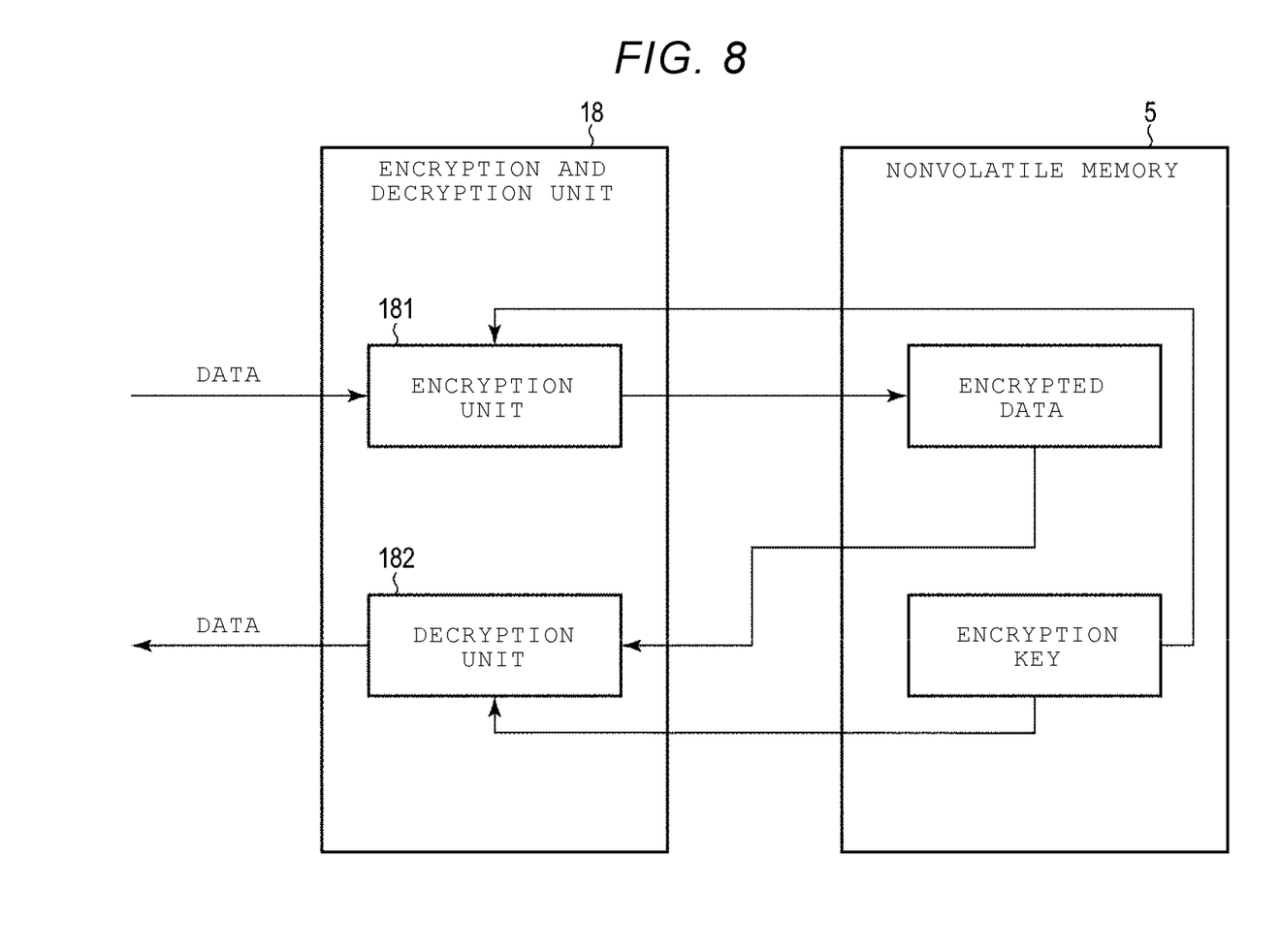
FIG. 8 depicts a data flow in a memory system according to a first embodiment.

Next, the encryption process and the decryption process executed by the encryption and decryption unit 18 will be described. FIG. 8 depicts a data flow in the memory system 3. In particular, the block diagram illustrates data and an encryption key that are input to the encryption unit 181 of the memory system 3 when the encryption process is executed, and encrypted data and the encryption key that are input to the decryption unit 182 of the memory system 3 when the decryption process is executed according to the first embodiment of the present disclosure.

When the encryption and decryption unit 18 receives data, the encryption unit 181 of the encryption and decryption unit 18 reads the encryption key from the nonvolatile memory 5. The data received by the encryption and decryption unit 18 may be data associated with the write command received from the host 2, or may be internal data used by the memory system 3. The encryption unit 181 encrypts the received data by using the read encryption key. The encryption unit 181 writes the encrypted data to the nonvolatile memory 5. The encryption process is performed as described above.

When reading the encrypted data from the nonvolatile memory 5, the decryption unit 182 reads the encryption key from the nonvolatile memory 5. The decryption unit 182 decrypts the read encrypted data by using the read encryption key. The decryption process is performed as described above.

Figure 9:
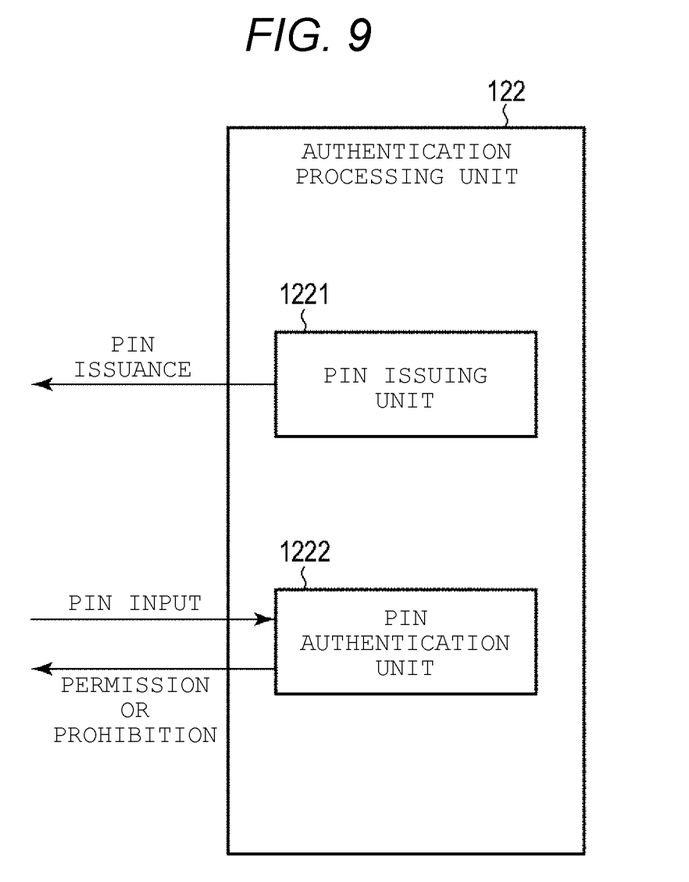
FIG. 9 depicts operations performed by an authentication processing unit of a memory system according to a first embodiment.

Next, the authentication process executed by the authentication processing unit 122 will be described. FIG. 9 depicts operations performed by the authentication processing unit 122 of the memory system 3 according to the first embodiment. In particular, the block diagram illustrates a PIN issued from the authentication processing unit 122 and a PIN input to the authentication processing unit 122 according to the first embodiment of the present disclosure.

For example, when power is first supplied to the memory system 3 after the memory system 3 is shipped, a PIN issuing unit 1221 of the authentication processing unit 122 notifies the host 2 of the pseudo random number as an initial PIN. The initial PIN is identification information used to identify the host 2.

Next, when a PIN is input by the host 2, a PIN authentication unit 1222 determines whether the input PIN matches the initial PIN issued by the PIN issuing unit 1221. The PIN is input to the controller 4.

When the input PIN and the issued initial PIN match each other, the PIN authentication unit 1222 notifies the CPU 12 of information indicating that the input PIN and the issued initial PIN match each other. Upon receipt of the notification, the CPU 12 allows access to the protected data stored in the nonvolatile memory 5 based on the I/O command to be input thereafter.

When the PIN input by the host 2 and the initial PIN issued to the host 2 do not match each other, the PIN authentication unit 1222 notifies the CPU 12 of information indicating that the input PIN and the issued initial PIN do not match each other. Upon receipt of the notification, the CPU 12 does not allow access to the protected data stored in the nonvolatile memory 5.

Figure 10:
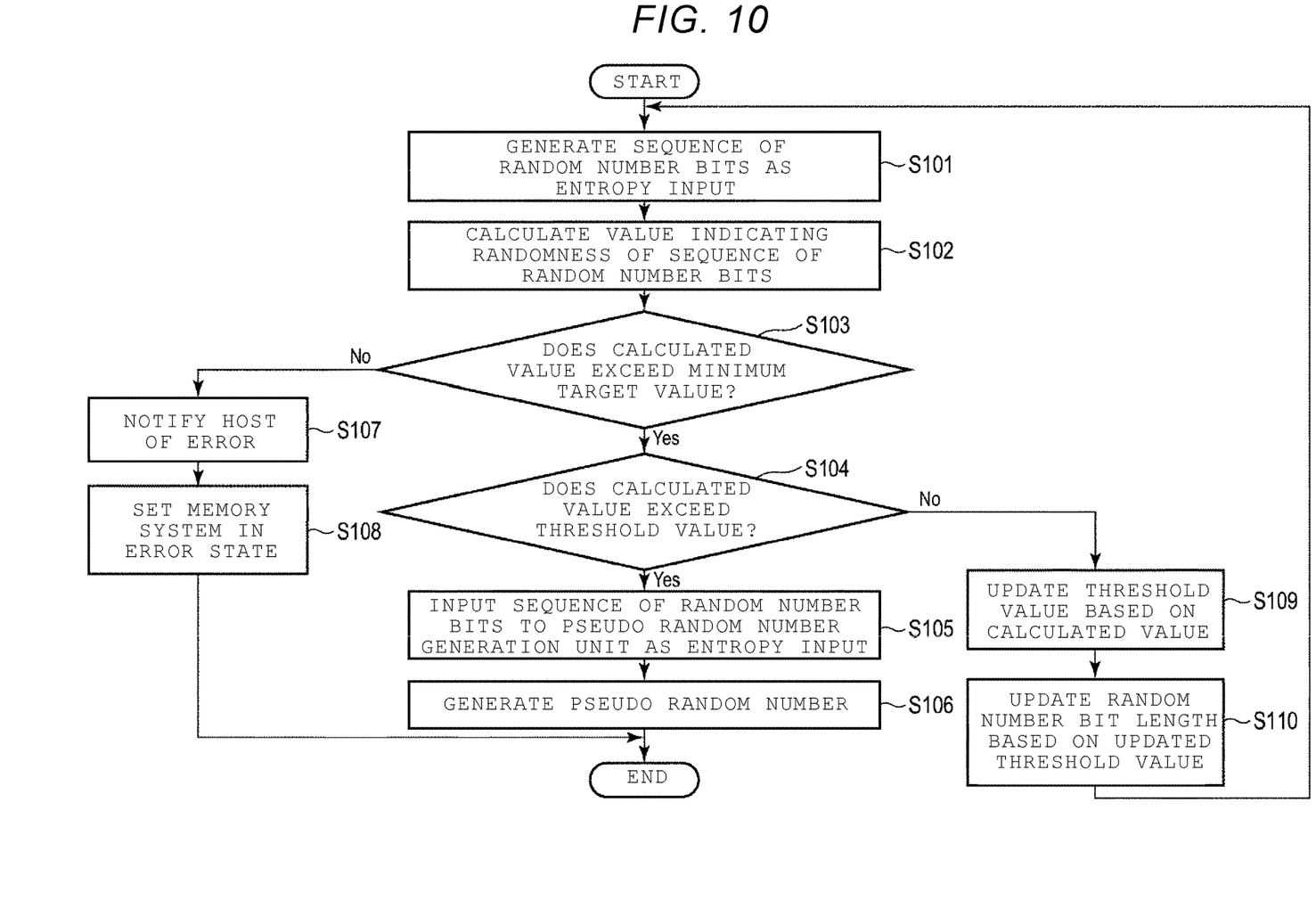
FIG. 10 is a flowchart of a pseudo random number generation process executed in a memory system according to a first embodiment.

Next, a procedure of a pseudo random number generation process will be described. FIG. 10 is a flowchart of the pseudo random number generation process executed in the memory system 3 according to the first embodiment of the present disclosure.

For example, when power is first supplied to the memory system 3 after the memory system 3 is shipped, or when a command indicating a change in the encryption key is received, the controller 4 starts the pseudo random number generation process.

The self-test unit 121 of the controller 4 instructs the entropy source 16 to generate a sequence of random number bits. Accordingly, the entropy source 16 generates the sequence of the random number bits (S101).

The self-test unit 121 calculates a value indicating randomness of the sequence of the random number bits generated by the entropy source 16 in S101 (S102). For example, the self-test unit 121 calculates a minimum entropy of the sequence of the random number bits as a value indicating the randomness of the sequence of the random number bits.

The self-test unit 121 determines whether the value calculated in S102 exceeds a minimum target value (S103). In S103, the self-test unit 121 compares the value calculated in S102 with the minimum target value.

When the value calculated in S102 exceeds the minimum target value (S103, Yes), the self-test unit 121 determines whether the value calculated in S102 exceeds a threshold value (S104). In S104, the self-test unit 121 compares the value calculated in S102 with the threshold value.

When the value calculated in S102 exceeds the threshold value (S104, Yes), the self-test unit 121 inputs the sequence of the random number bits generated by the entropy source 16 to the pseudo random number generation unit 17 (S105).

The pseudo random number generation unit 17 generates a pseudo random number by using the input sequence of the random number bits as an entropy input (S106). Next, the controller 4 ends the process.

When the value calculated in S102 is equal to or less than the minimum target value (S103, No), the self-test unit 121 determines that deterioration in performance of the entropy source 16 exceeds an allowable range. In response to this determination, the controller 4 notifies the host 2 of an error (S107). Next, the controller 4 sets the memory system 3 in an error state (S108). In the error state, the memory system 3 does not execute any I/O command issued by the host 2. Next, the controller 4 ends the process.

When the value calculated in S102 is equal to or less than the threshold value (S104, No), the self-test unit 121 updates the threshold value to a value smaller than the current value (S109). The self-test unit 121 writes the updated threshold value to the nonvolatile memory 5. Alternatively, the self-test unit 121 may store the updated threshold value in the RAM 6. When the updated threshold value is stored in the RAM 6, the self-test unit 121 may write the updated threshold value to the nonvolatile memory 5 before the power of the memory system 3 is turned off.

Next, the self-test unit 121 updates a random number bit length based on the updated threshold value (S110). The self-test unit 121 determines the random number bit length corresponding to the updated threshold value. Next, the self-test unit 121 notifies the entropy source 16 of the determined random number bit length.

Next, the self-test unit 121 instructs the entropy source 16 to generate the sequence of the random number bits. Accordingly, the entropy source 16 generates the sequence of the random number bits having a length indicated by the random number bit length updated in S110 (S101).

Accordingly, even though the randomness of the sequence of the random number bits has been reduced, the length of the sequence of the random number bits becomes longer, such that security strength of the pseudo random number generated by using the sequence of the random number bits can be maintained.

In this manner, even though the performance of the entropy source 16 deteriorates, the pseudo random number can be generated without causing an error by updating the threshold value to a lower value, when the value indicating the randomness of the sequence of the random number bits generated by the entropy source 16 exceeds the minimum target value. When the threshold value is updated to the lower value, the length of the sequence of the random number bits to be generated is lengthened, such that the security strength of the generated pseudo random number can be maintained. Specifically, when the threshold value is updated from the threshold value Th1 to the threshold value Th2, the length of the sequence of the random number bits to be generated is changed from the length of 32 bytes corresponding to the threshold value Th1 to the length of 64 bytes corresponding to the threshold value Th2. When the threshold value is updated from the threshold value Th2 to the threshold value Th3, the length of the sequence of the random number bits to be generated is changed from the length of 64 bytes corresponding to the threshold value Th2 to the length of 128 bytes corresponding to the threshold value Th3.

Second Embodiment

Figure 11:
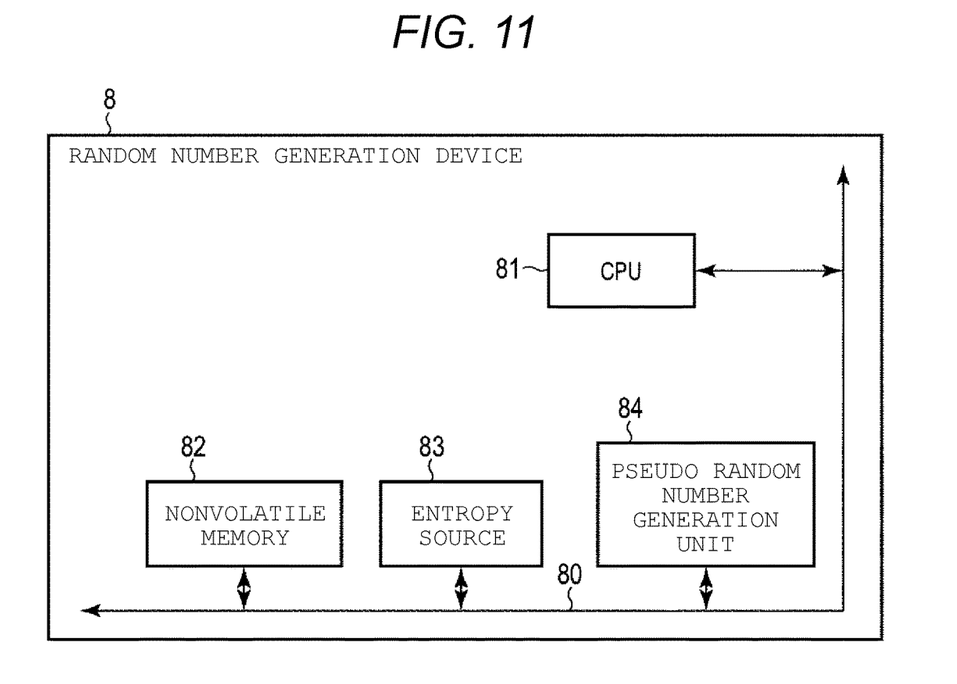
FIG. 11 is a block diagram of a random number generation device according to a second embodiment.

Next, a random number generation device 8 according to a second embodiment will be described. In the random number generation device 8 according to the second embodiment, some components are omitted from the memory system 3 according to the first embodiment. FIG. 11 is a block diagram of the random number generation device 8 according to the second embodiment of the present disclosure.

The random number generation device 8 generates a random number. The random number generation device 8 includes a CPU 81, a nonvolatile memory 82, an entropy source 83, and a pseudo random number generation unit 84. The CPU 81, the nonvolatile memory 82, the entropy source 83, and the pseudo random number generation unit 84 are connected to each other via a bus 80.

The CPU 81 is a processor. The CPU 81 controls the nonvolatile memory 82, the entropy source 83, and the pseudo random number generation unit 84. The CPU 81 performs various processes by executing a control or firmware program.

The nonvolatile memory 82 is a nonvolatile memory. The nonvolatile memory 82 is, for example, an EEPROM or a NAND flash memory. The nonvolatile memory 82 is used to store an updated threshold value.

The entropy source 83 is a circuit that generates a sequence of random number bits as an entropy input. The entropy source 83 generates the sequence of the random number bits based on a random number bit length. The random number bit length is a numerical value representing a length of the sequence of the random number bits.

The pseudo random number generation unit 84 is a circuit that generates a pseudo random number. The pseudo random number generation unit 84 generates the pseudo random number by using the sequence of the random number bits generated by the entropy source 83 as the entropy input.

Figure 12:
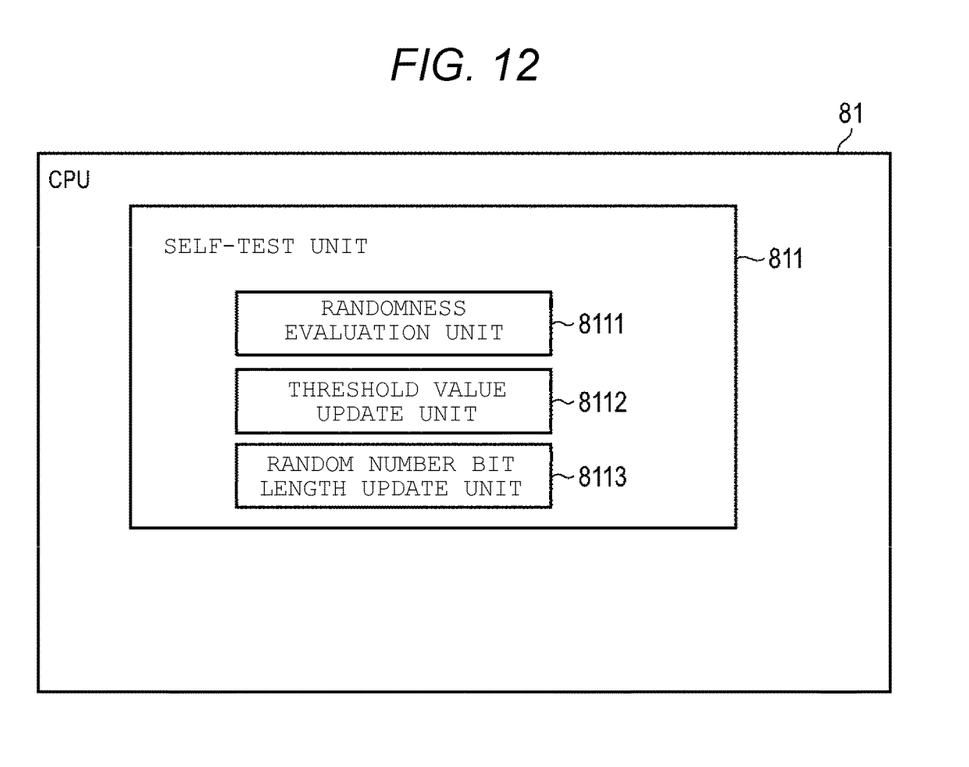
FIG. 12 is a functional block diagram of a random number generation device according to a second embodiment.

Next, functions performed by the CPU 81 will be described. FIG. 12 is a functional block diagram of the random number generation device 8 including the CPU 81 according to the second embodiment of the present disclosure.

The CPU 81 performs the function of a self-test unit 811. The self-test unit 811 includes a randomness evaluation unit 8111, a threshold value update unit 8112, and a random number bit length update unit 8113. The randomness evaluation unit 8111, the threshold value update unit 8112, and the random number bit length update unit 8113 execute a randomness evaluation process, a threshold value update process, and a random number bit length update process. The randomness evaluation process, the threshold value update process, and the random number bit length update process are the same as the randomness evaluation process, the threshold value update process, and the random number bit length update process executed by the controller 4 of the memory system 3 according to the first embodiment.

The random number generation device 8 according to the second embodiment executes a pseudo random number generation process including the randomness evaluation process, the threshold value update process, and the random number bit length update process in the same procedure as that of the pseudo random number generation process executed by the controller 4 of the memory system 3 according to the first embodiment.

Figure 13:
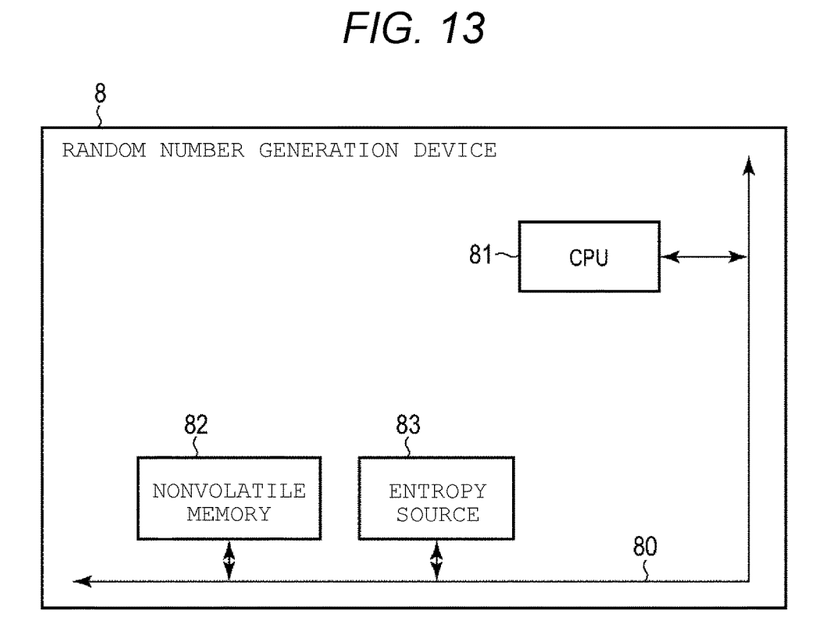
FIG. 13 is a block diagram of a random number generation device according to a second embodiment.
Figure 14:
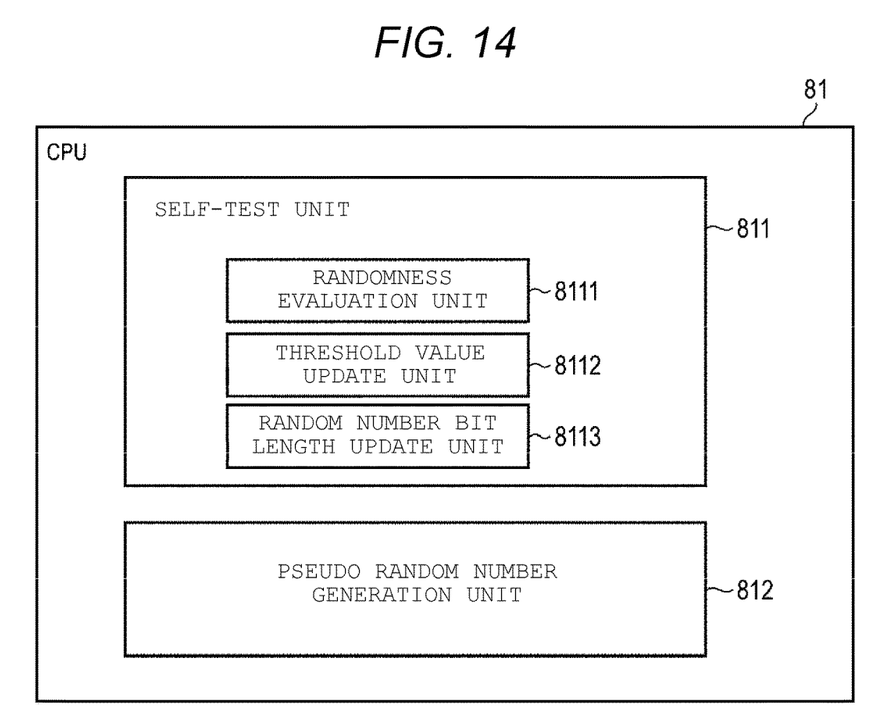
FIG. 14 is a functional block diagram of a random number generation device according to a second embodiment.

Next, another configuration example of the random number generation device 8 according to the second embodiment will be described. FIG. 13 is a block diagram of the random number generation device 8 in this other example. FIG. 14 is a functional block of the random number generation device 8 including the CPU 81 in this other example.

Most of the components in this example of the random number generation device 8 according to the second embodiment are substantially the same as those of the random number generation device 8 described with reference to FIGS. 11 and 12.

In the random number generation device 8 of this example, functions of a pseudo random number generation unit 812 are provided by the CPU 81.

A process executed by the pseudo random number generation unit 812 is the same as the process executed by the pseudo random number generation unit 84.

As described above, according to the above-described embodiments and examples, the value indicating the randomness of the sequence of the random number bits generated by the entropy source 16 is calculated. While the calculated value exceeds the minimum target value related to the randomness of the sequence of the random number bits, the threshold value and the length of the sequence of the random number bits are dynamically updated based on the calculated value. The randomness of the sequence of the random number bits generated by the entropy source 16 may be reduced by deterioration in the entropy source 16 over time. The security strength of the pseudo random number generated by the pseudo random number generation unit 17 is determined, based on the randomness of the sequence of the random number bits used by the pseudo random number generation unit 17 as the entropy input and the length of the sequence of the random number bits. Therefore, by dynamically updating the threshold value and the length of the sequence of the random number bits based on the calculated value, fluctuation in the randomness of the sequence of the random number bits generated by the entropy source 16 is mitigated, and the pseudo random number having stable security strength can be generated.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host device, the memory system comprising:
   a nonvolatile memory;
   a first circuit configured to generate a sequence of random number bits; and
   a processor configured to:
      instruct the first circuit to generate a sequence of random number bits having a first length,
      calculate a first value indicating randomness of the sequence of random number bits,
      determine whether the first value exceeds a first threshold value,
      upon determining that the first value does not exceed the first threshold value, notify the host device of an error, and
      upon determining that the first value exceeds the first threshold value,
         determine whether the first value exceeds a second threshold value that is greater than the first threshold value, and
         upon determining that the first value exceeds the second threshold value,
            generate a first pseudo random number using the sequence of random number bits, and
            write data to the nonvolatile memory using the first pseudo random number, and
         upon determining that the first value does not exceed the second threshold value,
            update the second threshold value to a third threshold value that is less than the second threshold value and greater than the first threshold value, and then determine a second length corresponding to the third threshold value, the second length being greater than the first length, instruct the first circuit to generate another sequence of random number bits having the second length, generate a second pseudo random number using said another sequence of random number bits, and write data to the nonvolatile memory using the second pseudo random number.

2. The memory system according to claim 1, wherein the processor is further configured to, after said another sequence of random number bits is generated:

calculate a second value indicating randomness of said another sequence of random number bits having the second length, and determine that the second value exceeds the third threshold value.

3. The memory system according to claim 1, wherein the processor is further configured to, when the first value does not exceed the first threshold value, set the memory system to be in an error state in which an I/O command received from the host device is not executed.

4. The memory system according to claim 1, wherein the processor is further configured to:

after the first pseudo random number is generated, encrypt data to be written to the nonvolatile memory using the first pseudo random number, and after the second pseudo random number is generated, encrypt data to be written to the nonvolatile memory using the second pseudo random number.

5. The memory system according to claim 1, wherein the processor is configured to:

after the first pseudo random number is generated, notify the host device of the first pseudo random number as identification information, and upon receipt of first identification information from the host device, execute an authentication process for the host device based on whether the first identification information matches the first pseudo random number, and after the second pseudo random number is generated, notify the host device of the second pseudo random number as identification information, and upon receipt of second identification information from the host device, execute the authentication process based on whether the second identification information matches the second pseudo random number.

6. A random number generation device, comprising:

a first circuit configured to generate a sequence of random number bits; and a processor configured to:

instruct the first circuit to generate a sequence of random number bits having a first length, calculate a first value indicating randomness of the sequence of random number bits, determine whether the first value exceeds a first threshold value, upon determining that the first value does not exceed the first threshold value, issue an error signal, and upon determining that the first value exceeds the first threshold value, determine whether the first value exceeds a second threshold value that is greater than the first threshold value, upon determining that the first value exceeds the second threshold value, generate a first pseudo random number using the sequence of random number bits, and upon determining that the first value does not exceed the second threshold value, update the second threshold value to a third threshold value that is less than the second threshold value and greater than the first threshold value, and then determine a second length corresponding to the third threshold value, the second length being greater than the first length, instruct the first circuit to generate another sequence of random number bits having the second length, and generate a second pseudo random number using said another sequence of random number bits.

7. The random number generation device according to claim 6, wherein the processor is further configured to, after said another sequence of random number bits is generated:

calculate a second value indicating randomness of said another sequence of random number bits having the determined second length, and determine that the second value exceeds the third threshold value.

8. A method for generating a random number by a memory system connectable to a host device, the method comprising:

generating a sequence of random number bits having a first length;

calculating a first value indicating randomness of the sequence of random number bits;

determining whether the first value exceeds a first threshold value;

upon determining that the first value does not exceed the first threshold value, notifying the host device of an error; and upon determining that the first value exceeds the first threshold value, determining whether the first value exceeds a second threshold value that is greater than the first threshold value, upon determining that the first value exceeds the second threshold value, generating a first pseudo random number using the sequence of random number bits, and writing data to a nonvolatile memory using the first pseudo random number, and upon determining that the first value does not exceed the second threshold value, updating the second threshold value to a third threshold value that is less than the second threshold value and greater than the first threshold value, and then determining a second length corresponding to the third threshold value, the second length being greater than the first length, generating another sequence of random number bits having the second length, generating a second pseudo random number using said another sequence of random number bits, and writing data to the nonvolatile memory using the second pseudo random number.

9. The method according to claim 8, further comprising, after said another sequence of random number bits is generated:

calculating a second value indicating randomness of said another sequence of random number bits having the determined second length; and determining that the second value exceeds the third threshold value.

10. The method according to claim 8, further comprising:
when the first value does not exceed the first threshold value, setting the memory system to be in an error state in which an I/O command received from the host device is not executed.

11. The method according to claim 8, further comprising:
after the first pseudo random number is generated, encrypting data to be written to the memory system using the first pseudo random number, and after the second pseudo random number is generated, encrypting data to be written to the nonvolatile memory using the second pseudo random number.

* * * * *